United States Patent
Wu

(10) Patent No.: US 8,724,940 B2
(45) Date of Patent: May 13, 2014

(54) CIRCUIT BOARD ASSEMBLY HAVING OPTICAL TRANSCEIVERS FOR SIGNAL TRANSMISSION

(75) Inventor: Kai-Wen Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 31 days.

(21) Appl. No.: 13/564,735

(22) Filed: Aug. 2, 2012

(65) Prior Publication Data

US 2013/0302036 A1    Nov. 14, 2013

(30) Foreign Application Priority Data

May 8, 2012    (TW) .............................. 101116296 A

(51) Int. Cl.
*G02B 6/00*     (2006.01)
*G02B 6/36*     (2006.01)

(52) U.S. Cl.
USPC .............................................. 385/14; 385/147

(58) Field of Classification Search
USPC .......... 385/10–14, 15, 16, 147; 398/135, 164, 398/138; 257/666
See application file for complete search history.

(56) References Cited

U.S. PATENT DOCUMENTS

| | | | |
|---|---|---|---|
| 5,506,445 A * | 4/1996 | Rosenberg | 257/666 |
| 6,213,651 B1 * | 4/2001 | Jiang et al. | 385/92 |
| 6,592,269 B1 * | 7/2003 | Brophy et al. | 385/92 |
| 6,901,221 B1 * | 5/2005 | Jiang et al. | 398/138 |
| 7,218,806 B2 * | 5/2007 | Han et al. | 385/24 |
| 2006/0088246 A1 * | 4/2006 | Han et al. | 385/47 |
| 2006/0210215 A1 * | 9/2006 | Aoki et al. | 385/14 |

* cited by examiner

*Primary Examiner* — Akm Enayet Ullah
(74) *Attorney, Agent, or Firm* — Novak Druce Connolly Bove + Quigg LLP

(57) ABSTRACT

A circuit board assembly includes a first circuit board, and a second circuit board, a first optical transceiver, a number of first light wave guides, a second optical transceiver, and a number of second light wave guides. The first circuit board defines a number of first through holes. The second circuit board defines a number of second and third through holes. Each of the third through holes is aligned with a respective first though hole. The first optical transceiver is optically coupled with the second through holes. The first light wave guides are mounted on one surface of the first circuit board and optically coupled with the second through holes. The second optical transceiver is optically coupled with the third through holes. The second light wave guides are mounted on another surface of the first circuit board and are optically coupled with the first through holes.

15 Claims, 3 Drawing Sheets

500# CIRCUIT BOARD ASSEMBLY HAVING OPTICAL TRANSCEIVERS FOR SIGNAL TRANSMISSION

BACKGROUND

1. Technical Field

The present disclosure relates to circuit board assemblies and, particularly, to a circuit board assembly having optical transceivers for signal transmission.

2. Description of Related Art

A typical circuit board assembly includes a first circuit board, a second circuit board, and at least one optical transceiver. The second circuit board is mounted on a top surface of the first circuit board and electrically connected to the first circuit board. The optical transceiver is mounted on the second circuit board away from the top surface for sending or receiving light signals. The second circuit board defines a number of through holes for the light signals to pass through. A number of light wave guides are formed on the top surface and optically coupled with the through holes for transmitting the light signals. However, the top surface also carries various electric circuits and various electric elements are mounted thereon. Therefore, the design of an efficient layout of the top surface becomes very difficult.

Therefore, it is desirable to provide a circuit board assembly, which can overcome the above-mentioned problems.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will be described with reference to the drawings.

Figure 1:
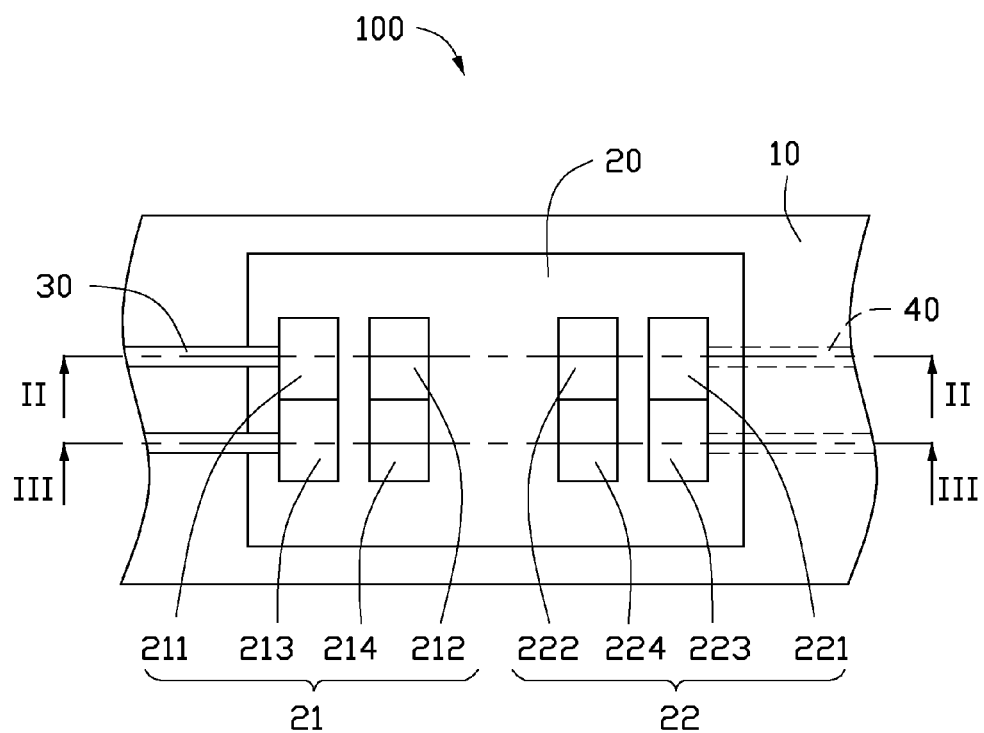
FIG. 1 is a partially assembled view of a circuit board assembly according to an embodiment, which is viewed from a top plan.
Figure 2:
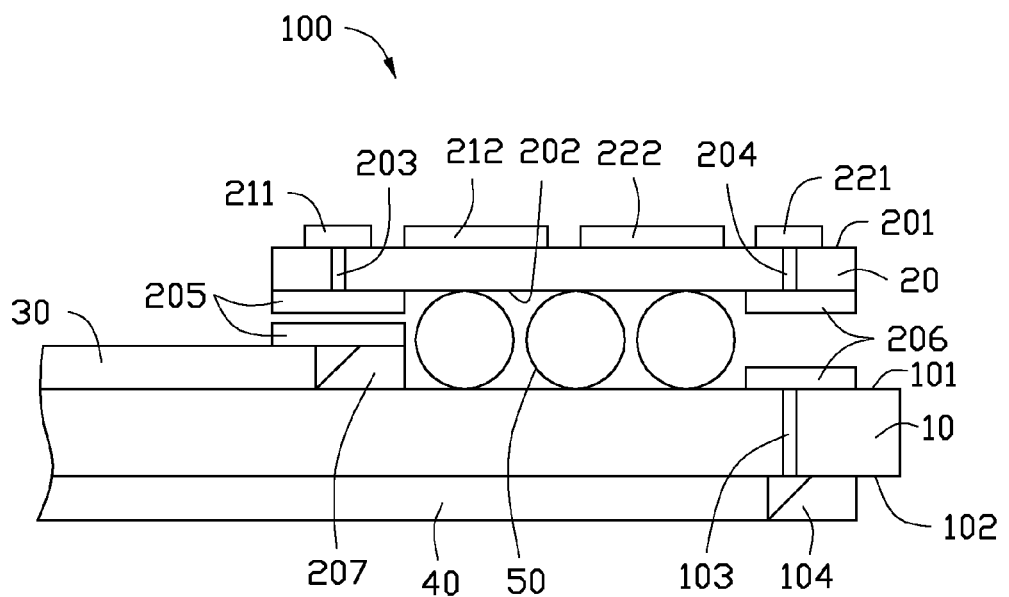
FIG. 2 is a cross-sectional schematic view taken along line II-II of FIG. 1.
Figure 3:
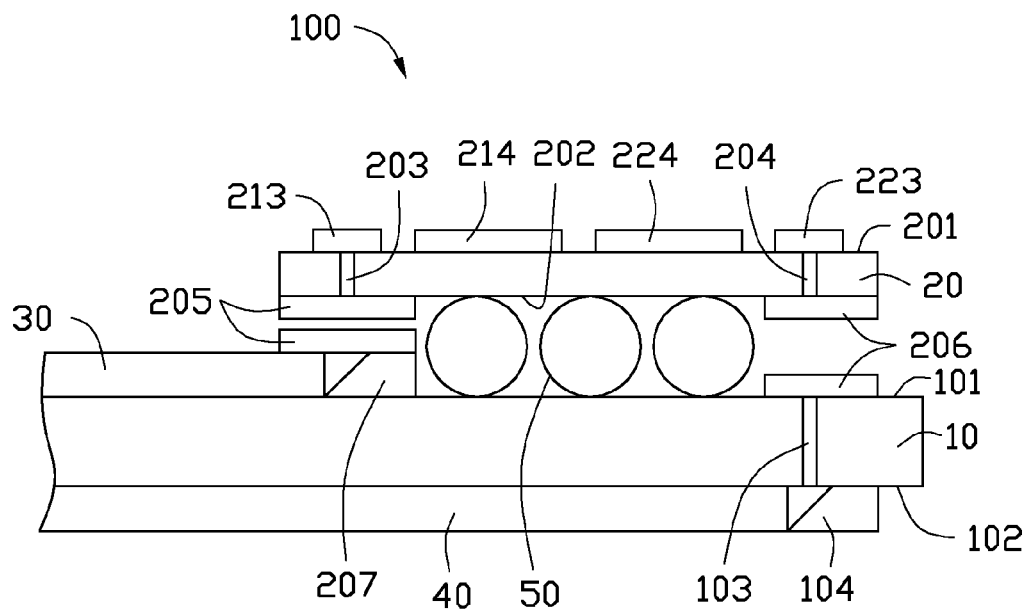
FIG. 3 is a cross-sectional schematic view taken along line III-III of FIG. 1.

FIGS. 1 to 3 illustrate a circuit board assembly 100 according to an embodiment. The circuit board assembly 100 includes a first circuit board 10, a second circuit board 20, a first optical transceiver 21, a second optical transceiver 22, a number of first light wave guides 30, and a number of second light wave guides 40.

The first circuit board 10 can be a grid-printed circuit board or a flexible printed circuit board. In the embodiment, the first circuit board 10 is a grid-printed circuit board. The first circuit board 10 includes a top surface 101 and a bottom surface 102 opposite to the top surface 101. The first circuit board 10 defines a number of first through holes 103 perpendicularly passing through the top surface 101 and the bottom surface 102. In the embodiment, the first circuit board 10 defines two first through holes 103.

The second circuit board 20 is a low-temperature co-fired ceramic (LTCC) substrate and includes an upper surface 201, a lower surface 202 opposite to the upper surface 201, and a ball grid array (BGA) 50 mounted on the lower surface 202. The second circuit board 20 is soldered to the top surface 101 and electrically connected to the first circuit board 10 through the BGA 50. The lower surface 202 faces the top surface 101. The second circuit board 20 defines a number of second through holes 203 and a number of third through holes 204 perpendicularly passing through the upper surface 201 and the lower surface 202. In the embodiment, there are two second through holes 203 and two third through holes 204. A diameter of each third passing hole 204 corresponds to a diameter of each first through hole 103. Each third passing hole 204 is aligned with a respective one of the first through holes 103.

The first optical transceiver 21 is mounted on the upper surface 201 adjacent to the second through holes 203. The first optical transceiver 21 includes a first laser diode 211, a first laser driver 212 electrically connected to the first laser diode 211, a first photo diode 213, and a first controller 214 electrically connected to the first photo diode 213. The first laser diode 211 is aligned with one of the second through holes 203 for sending light signals through the second through hole 203. The first photo diode 213 is aligned with the other second through hole 203 for receiving light signals through the other second through hole 203.

The second optical transceiver 22 is mounted on the upper surface 201 adjacent to the third through holes 204. The second optical transceiver 22 includes a second laser diode 221, a second laser driver 222 electrically connected to the second laser diode 221, a second photo diode 223, and a second controller 224 electrically connected to the second photo diode 223. The second laser diode 221 is aligned with one of the third through holes 204 for sending light signals through the third through hole 204. The second photo diode 223 is aligned with the other third through hole 204 for receiving light signals through the other third hole 204.

The first light wave guides 30 are directly positioned on the top surface 101 by a planar light wave guide circuit (PLC) technology. In the embodiment, there are two first wave light guides 30. One end of each first light wave guide 30 is adjacent to one of the second through holes 203. The circuit board assembly 20 further includes two first reflecting elements 207 mounted on the top surface 101 of the first circuit board 10. One of the first reflecting elements 207 is aligned with one of the second through holes 203 and positioned in a light path between the first laser diode 211 and one of the first light wave guides 30. The other first reflecting element 207 is aligned with the other second through hole 203 and positioned in a light path between the first photo diode 213 and the other first light wave guide 30.

The circuit board assembly 100 further includes a number of first converging lenses 205 positioned between the second through holes 203 and the first reflecting elements 207. In the embodiment, there are four first converging lenses 205. Two of the first converging lenses 205 are fixed to the lower surface 202 and each is aligned with a respective second through hole 203. The other two first converging lenses 205 are fixed to the first reflecting elements 207 and the ends of the first light wave guides 30 and each is aligned with a respective second through hole 203.

The second light wave guides 40 are directly positioned on the bottom surface 102 by means of the PLC technology. In the embodiment, there are two second wave light guides 40. One end of each second light wave guide 40 is adjacent to one of the third through holes 204. The circuit board assembly 100 further includes two second reflecting elements 104 mounted on the bottom surface 102. One of the second reflecting elements 104 is aligned with one of the first through holes 103 and positioned in a light path between the second laser diode 221 and one of the second light wave guides 40. The other second reflecting element 104 is aligned with the other first through hole 103 and positioned in a light path between the second photo diode 223 and the other second light wave guide 40.

The circuit board assembly 100 further includes a number of second converging lenses 206 positioned between the third through holes 204 and the first through holes 103. In the embodiment, there are four second converging lenses 206. Two of the second converging lenses 206 are fixed to the lower surface 202 and each is aligned with a respective third through hole 204. The other two second converging lenses 206 are fixed to the top surface 101 and each is aligned with a respective first through hole 103 and a respective third through hole 204.

When the first optical transceiver 21 sends light signals, the first laser driver 213 drives the first laser diode 211 to emit light signals. The light signals pass through a second through hole 203, through two of the first converging lenses 205 aligned with the second through hole 203, and are then reflected by one of the first reflecting elements 207 and guided into a respective first light wave guide 30. Then the lights signals are transmitted by the first light wave guide 30. When the first optical transceiver 21 receives light signals, light signals come through the other first light wave guide 30 and are projected onto the other first reflecting member 207 and reflected by the first reflecting member 207. Then the light signals pass through the other two of the first converging lenses 205 aligned with the other second through hole 203, and then pass through the other second through hole 203. The light signals are finally received by the first photo diode 213 and converted to electric signals by first photo diode 213. The first controller 214 processes the first electric signals.

When the second optical transceiver 22 sends light signals, the second laser driver 223 drives the second laser diode 221 to emit light signals. The light signals pass through a third through hole 204, through two of the second converging lenses 206 aligned with the third through hole 204, a first through hole 103, and are then reflected by one of the second reflecting elements 104 and guided into a second light wave guide 40. Then the lights signals are transmitted by the second light wave guide 40. When the second optical transceiver 22 receives light signals, lights signals come through the other second light wave guide 40 and are projected onto the other second reflecting member 104 and then reflected by the other second reflecting member 104. Then the light signals pass through the other first through hole 103, through the other two of the second converging lenses 205 aligned with the other third through hole 204, and then through the other third through hole 204. Finally, the light signals are received by the second photo diode 223 and converted to electric signals by the second photo diode 213. The second controller 224 processes the second electric signals.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A circuit board assembly, comprising:
   a first circuit board comprising a top surface and a bottom surface opposite to the top surface, the first circuit board defining a number of first through holes passing through the top surface and the bottom surface;
   a second circuit board electrically connected to the top surface, the second circuit board comprising an upper surface and a lower surface, the lower surface opposite to the upper surface and facing the top surface, the second circuit board defining a number of second through holes and third through holes passing through the upper surface and the lower surface, each third through hole being aligned with a respect one of the first though holes;
   a first optical transceiver mounted on the upper surface and optically coupled with second through holes;
   a number of first light wave guides mounted on the top surface and optically coupled with second through holes for transmitting light signals for the first optical transceiver;
   a second optical transceiver mounted on the upper surface and optically coupled with third through holes; and
   a number of second light wave guides mounted on the bottom surface and optically coupled with first through holes for transmitting light signals for the second optical transceiver.

2. The circuit board assembly of claim 1, wherein the first optical transceiver comprises a firs laser diode and a first photo diode; the number of the second through holes is two, the first laser diode is aligned with one of the second through holes, and the first photo diode is aligned with the other second through hole.

3. The circuit board assembly of claim 2, wherein the number of the first light wave guides is two, each first light wave guide is optically coupled with a respect one of the second through holes.

4. The circuit board assembly of claim 3, wherein the circuit board assembly comprises two first reflecting elements mounted on the top surface, one of the first reflecting elements is aligned with one of the second through holes and positioned in a light path between the first laser diode and one of the first light wave guides; the other first reflecting element is aligned with the other second through hole and positioned in a light path between the first photo diode and the other first light wave guide.

5. The circuit board assembly of claim 1, wherein the second optical transceiver comprises a second laser diode and a second photo diode; the number of the third through holes is two, and the number of the first through holes is two; the second laser diode is aligned with one of the third through holes, and the second photo diode is aligned with the other third through hole.

6. The circuit board assembly of claim 5, wherein the number of the second light wave guides is two, each second light wave guide is optically coupled with a respect one of the first through holes.

7. The circuit board assembly of claim 6, wherein the circuit board assembly comprises two second reflecting elements mounted on the bottom surface of the first circuit board; one of the second reflecting elements is aligned with one of the first through holes and positioned in a light path between the second laser diode and one of the second light wave guides; the other second reflecting element is aligned with the other first through hole and positioned in a light path between the second photo diode and the other second light wave guide.

8. The circuit board assembly of claim 1, wherein the first light wave guides and the second light wave guides are formed by a planar light wave guide circuit technology.

9. The circuit board assembly of claim 1, wherein the second circuit board is a low-temperature co-fired ceramic substrate.

10. The circuit board assembly of claim 1, wherein the second circuit board comprises a ball grid array, the second circuit board is soldered to the top surface through the ball grid array.

11. A circuit board assembly, comprising:
- a first circuit board comprising a top surface and a bottom surface opposite to the top surface, the first circuit board defining a number of first through holes passing thought the top surface and the bottom surface;
- a second circuit board electrically connected to the first circuit board and comprising an upper surface and a lower surface, the lower surface opposite to the upper surface and facing the top surface, the second circuit board defining a number of second through holes and third through holes passing thought the upper surface and the lower surface, each third through hole being aligned with a respect one of the first though holes;
- a number of first light wave guides mounted on the top surface and optically coupled with second through holes;
- a number of second light wave guides mounted on the bottom surface and optically coupled with first through holes;
- a first optical transceiver mounted on the upper surface and optically coupled with second through holes, the first optical transceiver sending and receiving light signals through the second through holes and the first light wave guides; and
- a second optical transceiver mounted on the upper surface and optically coupled with third through holes, the second optical transceiver sending and receiving light signals through the third through holes, the first through holes, and the second light wave guides.

12. The circuit board assembly of claim 11, wherein the first optical transceiver comprises a first laser diode and a first photo diode; the number of the second through holes is two, the first laser diode is aligned with one of the second through holes, and the first photo diode is aligned with the other second through hole.

13. The circuit board assembly of claim 12, wherein the number of the first light wave guides is two, each first light wave guide is optically coupled with a corresponding one of the second through holes.

14. The circuit board assembly of claim 11, wherein the second optical transceiver comprises a second laser diode and a second photo diode; the number of the third through holes is two, and the number of the first through hole is two; the second laser diode is aligned with one of the third through holes, and the second photo diode is aligned with the other third through hole.

15. The circuit board assembly of claim 14, wherein the number of the second light wave guides is two, each second light wave guides is optically coupled with a corresponding one of the first through holes.

* * * * *